United States Patent [19]

Parks et al.

[11] Patent Number: 5,187,239

[45] Date of Patent: * Feb. 16, 1993

[54] SULFUR VULCANIZABLE RUBBER COMPOSITIONS CONTAINING A METHYL TRIALKYL AMMONIUM SALT

[75] Inventors: Carl R. Parks, Akron; Richard M. D'Sidocky, Ravenna; Martin P. Cohen, Akron, all of Ohio

[73] Assignee: The Goodyear Tire & Rubber Company, Akron, Ohio

[*] Notice: The portion of the term of this patent subsequent to Aug. 29, 2006 has been disclaimed.

[21] Appl. No.: 495,921

[22] Filed: Mar. 22, 1990

Related U.S. Application Data

[63] Continuation-in-part of Ser. No. 290,796, Dec. 28, 1988, abandoned.

[51] Int. Cl.$^5$ .................. C08C 19/22; C08C 19/20
[52] U.S. Cl. ...................... 525/329.3; 525/330.5; 525/331.1; 525/331.8; 525/332.7; 525/346
[58] Field of Search ............... 525/329.3, 330.4, 330.5, 525/331.8, 331.1, 332.7

[56] References Cited

U.S. PATENT DOCUMENTS 3,357,957 12/1967 Bromby .......................... 525/346
3,370,049 2/1968 Miller .......................... 525/330.9
3,922,240 11/1975 Berg ............................ 524/236
4,602,052 7/1986 Weber .......................... 523/215
4,861,842 8/1989 Cohen .......................... 525/329.3

OTHER PUBLICATIONS

Chem Abst, 65, 2033(g) (1966, Scheele).

Primary Examiner—Christopher Henderson
Attorney, Agent, or Firm—Bruce J. Hendricks

[57] ABSTRACT

A method is disclosed for increasing the rate of vulcanization of a rubber composition comprising adding to a sulfur vulcanizable rubber a methyl trialkyl ammonium salt of the formula:

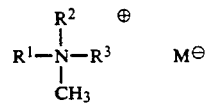

wherein $R^1$, $R^2$, and $R^3$ are independently alkyl radicals having 8 to 10 carbon atoms and M is selected from the group consisting of Cl, Br, $CH_3SO_4$ and $HSO_4$. Addition of a methyl trialkyl ammonium salt of the above formula significantly increases the rate of vulcanization of the rubber.

5 Claims, No Drawings

SULFUR VULCANIZABLE RUBBER COMPOSITIONS CONTAINING A METHYL TRIALKYL AMMONIUM SALT

This is a continuation-in-part of Ser. No. 07/290,796, filed on Dec. 28, 1988, now abandoned.

FIELD OF THE INVENTION

The present invention relates to the vulcanization of a sulfur curable rubber composition. More particularly, the present invention relates to a method for increasing the rate of cure of a sulfur vulcanizable rubber by the addition of a methyl trialkyl ammonium salt.

BACKGROUND OF THE INVENTION

The "rate of cure" is defined as the rate at which crosslinking and the development of the stiffness (modulus) of a rubber compound occurs. As the rubber compound is heated, the properties of the rubber compound change from a soft plastic to a tough elastic material. During the curing step, crosslinks are introduced, which connect the long polymer chains of the rubber. As more crosslinks are introduced, the polymer chains become more firmly connected and the stiffness or modulus of the compound increases. The rate of cure is an important vulcanization parameter since it in part determines the time the compound must be cured, i.e., the "cure time". In the manufacture of vulcanized rubber articles, significant cost savings can be realized through a reduction of cure time. Through enhanced rates of cure, the cure time required to meet minimum states of cure can be reduced. Given the above, extensive research has been conducted in order to shorten the cure times of rubbers. Therefore, there exists a need for improved methods which enhance the rate of cure in the absence of imparting undesirable properties to the vulcanizate.

SUMMARY OF THE INVENTION

The present invention relates to a method for enhancing the rate of vulcanization of a rubber composition comprising adding to a sulfur vulcanizable rubber a methyl trialkyl ammonium salt of the formula:

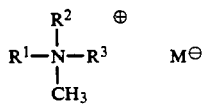

wherein $R^1$, $R^2$, and $R^3$ are independently alkyl radicals having 8 to 10 carbon atoms and M is selected from the group consisting of Cl, Br, $CH_3SO_4$ and $HSO_4$. In addition, there is disclosed a sulfur vulcanizable rubber composition comprising an elastomer containing olefinic unsaturation, a sulfur vulcanizing agent, an accelerator and a methyl trialkyl ammonium salt selected from the above formula.

DETAILED DESCRIPTION OF THE INVENTION

The present invention relates to the use of a methyl trialkyl ammonium salt as an activator for sulfur curable rubber compositions. A particularly preferred methyl trialkyl ammonium salt is methyl trialkyl($C_8$–$C_{10}$) ammonium chloride which is commercially available under the trademark Adogen® 464 from Sherex Chemical Company of Dublin, Ohio and from Henkel Corporation, Minneapolis, Minn., under the trademark Aliquot® 336. Methyl trialkyl ammonium salts are generally known as phase-transfer catalysts and are described in U.S. Pat. No. 3,992,432 which is incorporated by reference in its entirety.

For ease in handling, the methyl trialkyl ammonium salt may be deposited on suitable carriers. Examples of carriers which may be used in the present invention include silica, carbon black, alumina, kieselguhr, silica gel and calcium silicate.

Use of a methyl trialkyl ammonium salt does not appear to affect crosslink distribution when used in combination with primary and optionally secondary accelerators. However, along with increased cure rate, there is usually seen an increased curative efficiency in the form of increased state or degree of cure.

The present invention may be used to cure sulfur vulcanizable rubbers or elastomers containing olefinic unsaturation. The phrase "rubber or elastomer containing olefinic unsaturation" is intended to include both natural rubber and its various raw and reclaim forms as well as various synthetic rubbers. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers.

The activator used in the present invention may be added to the rubber by any conventional technique such as on a mill or in a Banbury. The amount of methyl trialkyl ammonium salt may vary widely depending on the type of rubber and other compounds present in the vulcanizable composition. Generally, the amount of methyl trialkyl ammonium salt is used in a range of from about 0.05 to about 5.0 phr with a range of 0.1 to about 1.5 phr being preferred.

Vulcanization of the rubber is generally carried out at temperatures of between about 100° C. and 200° C. Preferably, the vulcanization is conducted at temperatures ranging from about 110° C. to 180° C. Any of the usual vulcanization processes may be used such as heating in a press or mold, heating with superheated steam or hot air or in a salt bath.

In addition to the methyl trialkyl ammonium salt, other rubber additives may also be incorporated in the sulfur vulcanizable material. The additives commonly used in rubber vulcanizates are, for example, carbon black, tackifier resins, processing aids, antioxidants, antiozonants, stearic acid, activators, waxes, oils and peptizing agents. As known to those skilled in the art, depending on the intended use of the sulfur vulcanizable material, certain additives mentioned above are commonly used in conventional amounts. Typical additions of carbon black comprise about 20 to 100 parts by weight of diene rubber (phr), preferably 50 to 70 phr. Typical amounts of tackifier resins comprise about 5 to 10 phr. Typical amounts of processing aids comprise about 1 to 5 phr. Typical amounts of antioxidants comprise 1 to about 10 phr. Typical amounts of antiozonants comprise 1 to about 10 phr. Typical amounts of stearic acid comprise 1 to about 2 phr. Typical amounts of zinc oxide comprise 2 to 5 phr. Typical amounts of waxes comprise 1 to 5 phr. Typical amounts of oils comprise 5 to 30 phr. Typical amounts of peptizers comprise 0.1 to 1 phr. The presence and relative amounts of the above additives are not an aspect of the present invention.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 1.5 to 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to 2.0 phr. In another embodiment, combinations of two or more accelerators may be used which may consist of a primary accelerator which is generally used in the larger amount (0.5 to 1.0 phr), and a secondary accelerator which is generally used in smaller amounts (0.05–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not effected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The following examples are presented in order to illustrate but not limit the present invention.

EXAMPLES 1–11

These experiments contrast the effectiveness of methyl trialky($C_8$–$C_{10}$) ammonium chloride (MTAAC) at varying levels versus using an equivalent amount of tetraethyl ammonium bromide (TEABr) as a control. The MTAAC and TEABr were used in a typical sidewall rubber stock comprising 40 parts by weight of polyisoprene, 60 parts cis-1,4-polybutadiene, 0.5 phr of a primary accelerator and conventional amounts of carbon black, tackifier, processing aids, antidegradant, stearic acid, zinc oxide and sulfur. The various additives were compounded using conventional techniques. Cure testing was performed at 150° C. on a Monsanto Cure Rheometer according to ASTM test method D-2084-87. The scorch of the compound was measured according to ASTM test method D1646-87. Table I shows the results for Examples 1–11.

TABLE I

| Example | Activator | Amount | Rheometer, 150° C. | | | t5 pt rise @ 121° C. Scorch (min.) |
| | | | t25 (min.) | t90 (min.) | Torque (dNm) | |
|---|---|---|---|---|---|---|
| 1 (Control) | — | 0 | 7.9 | 26.5 | 20.3 | 26.0 |
| 2 | MTAAC | 0.2 | 6.0 | 18.4 | 24.1 | 21.3 |
| 3 | MTAAC | 0.4 | 5.3 | 16.0 | 25.9 | 18.0 |
| 4 | MTAAC | 0.6 | 4.8 | 14.3 | 27.4 | 15.2 |
| 5 | MTAAC | 0.8 | 3.9 | 13.4 | 28.0 | 13.8 |
| 6 | MTAAC | 1.0 | 3.9 | 12.8 | 28.4 | 12.4 |
| 7 (Control) | TEABr | 0.2 | 7.7 | 25.6 | 20.3 | 23.5 |
| 8 (Control) | TEABr | 0.4 | 7.6 | 22.5 | 18.3 | 19.5 |
| 9 (Control) | TEABr | 0.6 | 7.5 | 26.5 | 19.3 | 19.8 |
| 10 (Control) | TEABr | 0.8 | 7.8 | 26.2 | 18.4 | 18.4 |
| 11 (Control) | TEABr | 1.0 | 7.7 | 27.0 | 17.4 | 17.7 |

The data of Table I show that the control compound (tetraethyl ammonium bromide) showed little or no effect on cure time as evaluated by t25 and t90. Use of methyl trialkyl($C_8$–$C_{10}$) ammonium chloride (MTAAC), however, resulted in significantly reduced cure times.

EXAMPLES 12–19

Experiments (Examples 12–19) were conducted to demonstrate the enhanced cure rates by the addition of a methyl trialkyl($C_8$–$C_{10}$) ammonium salt to a sulfur vulcanizable rubber. An experiment (Example 12, Control) was conducted for comparative purposes. Experiments (Examples 13 and 14) were conducted to demonstrate the effectiveness of using 68% by weight of methyl trialkyl($C_8$–$C_{10}$) ammonium chloride deposited on calcium silicate. Experiments (Examples 15 and 16) were conducted to demonstrate the effectiveness of using 72% by weight of methyl trialkyl($C_8$–$C_{10}$) ammonium chloride deposited on silica. Experiments (Examples 17–19) were conducted to demonstrate the effectiveness of using methyl trialkyl($C_8$–$C_{10}$) ammonium methyl sulfate. The eight rubber compounds were prepared using varied levels of methyl trialkyl ammonium salt (phr) and a typical sidewall rubber stock comprising 40 parts polyisoprene, 60 parts cis-1,4-polybutadiene, 0.5 phr of a primary accelerator and conventional amounts of carbon black, tackifier, process oil, antidegradant, stearic acid, zinc oxide, and sulfur. The various additives were compounded using conventional techniques and the samples were evaluated using the curing procedures of Examples 1-11. Table II below lists the cure properties for the compounds of Examples 12-19 which resulted in similar states of cure with different cure rates as seen by t25 and t90.

The above data show that addition of a methyl trialkyl ammonium chloride reduces the cure time required to reach optimum cure. The use of the methyl trialkyl ammonium salt has little effect on crosslink distribution

TABLE II

| Example No. | 12 | 13 | 14 | 15 | 16 | 17 | 18 | 19 |
|---|---|---|---|---|---|---|---|---|
| Amount of methyl trialkyl ammonium salt (phr) | 0 | 0.25[1] | .50[1] | 0.25[2] | 0.50[2] | 0.17[3] | 0.34[3] | 0.50[3] |
| Rheometer, 150° C. | | | | | | | | |
| t2, min. | 7.0 | 5.8 | 5.2 | 5.8 | 4.8 | 5.9 | 5.2 | 4.9 |
| t25, min. | 9.4 | 7.5 | 6.6 | 7.5 | 6.3 | 7.6 | 6.8 | 6.3 |
| t90, min. | 26.8 | 19.8 | 17.4 | 19.3 | 16.6 | 19.6 | 18.1 | 17.2 |
| Delta torque, dNm | 21.2 | 24.5 | 25.9 | 24.6 | 26.1 | 24.2 | 25.5 | 25.8 |
| Mooney scorch, 121° C. t5, min. | 33.5 | 28.4 | 24.6 | 27.7 | 24.3 | 28.5 | 25.7 | 23.6 |

[1]68% by weight of methyl trialkyl($C_8$-$C_{10}$) ammonium chloride deposited on calcium silicate.
[2]72% by weight of methyl trialkyl($C_8$-$C_{10}$) ammonium chloride deposited on silica.
[3]Methyl trialkyl($C_8$-$C_{10}$) ammonium methyl sulfate.

Examples 13-19 demonstrate that methyl trialkyl($C_8$-$C_{10}$) ammonium salts are effective in enhancing the rates of cure. The data for Examples 13-16 indicate that use of various carriers are not detrimental to the effectiveness of methyl trialkyl($C_8$-$C_{10}$) ammonium chloride. Examples 17-19 suggest that methyl trialkyl($C_8$-$C_{10}$) ammonium methyl sulfate is as effective as the other methyl trialkyl ammonium salts used in the present invention.

EXAMPLES 20-21

The following experiments were conducted to demonstrate the cure activation of methyl trialkyl ammonium chloride (MTAAC). The formulation for Example 20 (Control) did not contain MTAAC and the formulation for Example 21 contained 0.30 phr of MTAAC. Both formulations comprised a typical sidewall rubber stock containing 20 parts by weight natural rubber, 20 parts by weight of synthetic polyisoprene, 60 parts by weight polybutadiene, 0.5 phr of a primary accelerator and conventional amounts of carbon black, waxes, oils, antidegradants, tackifier resin, stearic acid, zinc oxide, and sulfur. The various additives were compounded and the samples were vulcanized by compression molding for 18 minutes at 150° C. The cure properties were evaluated in the same manner as in Examples 1-11. The stress-strain properties were tested according to ASTM method No. D41Z-87. The data appear in Table III.

TABLE III

| Physical Properties of Example 20 (Control) and 21 | | |
|---|---|---|
| | Example 20 (Control) | Example 21 |
| Monsanto Rheometer, 1° Arc, 150° C. | | |
| Delta torque $M_{HF}$-$M_L$ (dNm) | 24 | 27.5 |
| Cure time, t90, min. | 23.5 | 15.0 |
| Cure time, t25, min. | 8.5 | 6.75 |
| t1 pt. rise, min. | 5.0 | 4.3 |
| t90 - t1 pt., min. | 18.5 | 10.7 |
| Crosslink Density and Type Analysis[1] | | |
| Crosslink density[2], $v \times 10^4$ | 1.96 | 2.10 |
| % $S_x$, Polysulfide | 76 | 76 |
| % $S_2$, Disulfide | 18 | 21 |
| % $S_1$, Monosulfide | 6 | 3 |
| Stress-Strain Data | | |
| Modulus at 300% elongation (MPa) | 5.6 | 7.4 |
| Tensile strength (MPa) | 14.6 | 14.4 |
| Elongation at break, (%) | 650 | 540 |

[1]Procedure as described in ACS Rubber Division Preprint - Toronto Spring 1983, Paper 51.
[2]Number of effective crosslinks per unit volume of rubber.

and allows for better utilization of sulfur as evidenced by an increase in crosslink density ($v \times 10^4$) and increased 300% modulus.

EXAMPLES 22-23

The following experiments were conducted to demonstrate the effectiveness of MTAAC in another sulfur vulcanizable composition. The formulation for Example 22 (Control) did not contain MTAAC and the formulation for Example 23 contained 0.50 phr of MTAAC. Both formulations comprised a typical tread rubber stock containing 30 parts by weight of polybutadiene, 70 parts by weight of SBR, 1 phr of a primary accelerator, 0.15 phr of a secondary accelerator and conventional amounts of carbon black, waxes, oil, peptizer, stearic acid, antidegradant, zinc oxide, and sulfur. The various additives were compounded and the samples were vulcanized by compression molding for 18 minutes at 150° C. After curing, these samples were evaluated using testing procedures of Examples 20-21. The data are set forth in Table IV.

TABLE IV

| Physical Properties of Example 22 (Control) and 23 | | |
|---|---|---|
| | Example 22 (Control) | Example 23 |
| Monsanto Rheometer, 1° Arc. 150° C. | | |
| Delta torque, $M_{HF}$-$M_L$ (dNm) | 22.8 | 24.5 |
| Cure time, t90, min. | 20 | 12.6 |
| Cure time, t25, min. | 8.6 | 6.6 |
| t1 pt. rise, min. | 6.6 | 5.4 |
| t90 - t1 pt, min. | 13.4 | 7.2 |
| Crosslink Type Analysis | | |
| % $S_x$, Polysulfide | 63 | 66 |
| % $S_2$, Disulfide | 22 | 24 |
| % $S_1$, Monosulfide | 15 | 10 |

Examples 22 and 23 demonstrate the effectiveness of MTAAC in a polybutadiene/SBR blend.

EXAMPLES 24 AND 25

The following examples were conducted in order to demonstrate the effectiveness of MTAAC in another sulfur vulcanizable composition. The formulation for Example 24 (Control) did not contain MTAAC and the formulation for Example 25 contained 0.2 phr of MTAAC. Both formulations comprised a typical tread rubber stock containing 70 parts by weight of medium vinyl polybutadiene, 30 parts by weight of cis-1,4-polybutadiene, 1.1 phr of a primary accelerator, 0.16 phr of a secondary accelerator and conventional amounts of carbon black, waxes, oil, antidegradants, stearic acid, zinc oxide and sulfur. The various additives were compounded using conventional techniques.

These samples were evaluated by the cure testing procedures used in Examples 20 and 21. The data are set forth in Table V.

TABLE V

| Cure Properties of Example 24 (Control) and 25 | | |
| --- | --- | --- |
| | Example 24 (Control) | Example 25 |
| Monsanto Rheometer, 1° Arc, 150° C. | | |
| Delta torque, $M_{HF}$-$M_L$ (dNm) | 30.7 | 31.5 |
| Cure time, t90, min. | 13.8 | 11.2 |
| Cure time, t25, min. | 7.4 | 5.8 |
| t1 pt rise, min. | 5.6 | 4.6 |
| t90 - t1 pt, min. | 8.2 | 6.6 |

EXAMPLES 26-29

These experiments contrast the effectiveness of methyl trialkyl($C_8$-$C_{10}$) ammonium chloride (MTAAC) in the presence or absence of an accelerator. The remaining component of the formulations for Examples 26-29 comprised a rubber stock containing 50 parts by weight of SBR, 50 parts by weight of polyisoprene and conventional amounts of oil (28.75 phr), carbon black (50 phr), zinc oxide (3 phr), sulfur (2 phr) and stearic acid (2 phr). In Example 26, no accelerator or MTAAC was used. In Example 27 no accelerator was used but 0.50 phr MTAAC (68% by weight of Adogen 464 on calcium silicate carrier) was used. In Example 28, 1.5 phr of accelerator was used but no MTAAC was used. In Example 29 1.5 phr of accelerator was used and 0.50 phr of MTAAC (same as Example 27) was used. The various additives were compounded using conventional techniques. Cure testing was performed at 150° C. on a Monsanto Cure Rheometer according to ASTM test method No. D-2084. The cure properties are given in Table VI below.

TABLE VI

| | Example 26 | Example 27 | Example 28 | Example 29 |
| --- | --- | --- | --- | --- |
| Rheometer, 150° C. | | | | |
| t2, min. | — | — | 13.20 | 8.90 |
| t25, min. | — | — | 16.50 | 11.20 |
| t90, min. | — | — | 24.70 | 16.60 |
| Delta torque, dNm | 4.10[1] | 8.50[1] | 29.10 | 29.40 |

[1] taken at 60 minutes.

Example 26 shows the very poor cure which occurs when no MTAAC or accelerator is used. The data from Example 27 show that, in the absence of an accelerator, use of MTAAC does not result in any substantial cure. The data for Example 28 show a typical accelerator effect. The data for Example 29 show a dramatic reduction in cure time when both an accelerator and MTAAC activator are used.

What is claimed is:

1. A sulfur vulcanizable rubber composition comprising an elastomer containing olefinic unsaturation, a vulcanizing agent, an accelerator and from about 0.05 phr to about 5.0 phr of a methyl trialkyl ammonium salt of the formula:

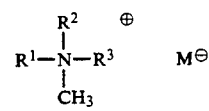

wherein $R^1$, $R^2$, and $R^3$ are independently alkyl radicals having 8 to 10 carbon atoms and M is selected from the group consisting of Cl, Br, $CH_3SO_4$ and $HSO_4$.

2. The sulfur vulcanizable rubber composition of claim 1 wherein M is Cl or $CH_3SO_4$.

3. The sulfur vulcanizable rubber composition of claim 1 wherein said elastomer is selected from the group consisting of natural rubber, neoprene, polyisoprene, butyl rubber, polybutadiene, styrene-butadiene copolymer, methyl methacrylate-butadiene copolymer, isoprene-styrene copolymer, methyl methacrylate- isoprene copolymer, acrylonitrile-isoprene copolymer, acrylonitrile-butadiene copolymer, EPDM or mixtures thereof.

4. The sulfur vulcanizable rubber composition of claim 1 wherein the sulfur vulcanizing agent is selected from the group consisting of elemental sulfur, amine disulfide, polymeric polysulfide or sulfur olefin adducts.

5. The sulfur vulcanizable composition of claim 1 wherein the accelerator is selected from the group consisting of amines, disulfides, guanidines, thioureas, thiazoles, thiurams, sulfenamides, dithiocarbamates, xanthates or mixtures thereof.

* * * * *